United States Patent [19]

Erhardt et al.

[11] Patent Number: 4,649,671
[45] Date of Patent: Mar. 17, 1987

[54] METHOD FOR THE PRECISION WORKING OF THE FLANKS OF GEARS WITH A GEAR-SHAPED TOOL COATED WITH HARD-MATERIAL GRANULES AND A METHOD FOR DRESSING SUCH A TOOL

[75] Inventors: Manfred Erhardt, Puchheim; Herbert Loos, Dorfen-Stadt; Gerhard Reichert, Puchheim, all of Fed. Rep. of Germany

[73] Assignee: Carl Hurth Maschinen und Zahnradfabrik GmbH & Co., Munich, Fed. Rep. of Germany

[21] Appl. No.: 732,198

[22] Filed: May 8, 1985

[51] Int. Cl.$^4$ ............................................... B24B 1/00
[52] U.S. Cl. ............................ 51/287; 51/95 GH; 51/105 GG
[58] Field of Search .......... 51/287, 105 HB, 105 GG, 51/95 GH, 5 D, 88, 26

[56] References Cited

U.S. PATENT DOCUMENTS

| | | | |
|---|---|---|---|
| 3,092,935 | 6/1963 | Daniel | 51/105 GG |
| 3,971,293 | 7/1976 | Hunkeler | 51/95 GH |
| 4,203,258 | 5/1980 | Held | 51/105 HB |

Primary Examiner—Frederick R. Schmidt
Assistant Examiner—Bradley I. Vaught
Attorney, Agent, or Firm—Flynn, Thiel, Boutell & Tanis

[57] ABSTRACT

A method for the manufacture or machining of the tooth system of straight or helically toothed, externally or internally toothed, nonhardened or hardened workpiece with a toothed tool, the tooth flanks of which are coated with a cubic boron nitride (CBN). The workpiece and the tool roll along with a single-flank contact and are supported by a guide-gear pair which also roll along with a single-flank contact. The contacting flanks of the workpiece-tool pair are the mating flanks for the contacting flanks of the guide-gear pair. To protect the CNB-coating, the tool is already driven at a speed which is necessary for an optimum chip removal before the tool tooth flanks start to work on the workpiece tooth flanks.

3 Claims, 10 Drawing Figures

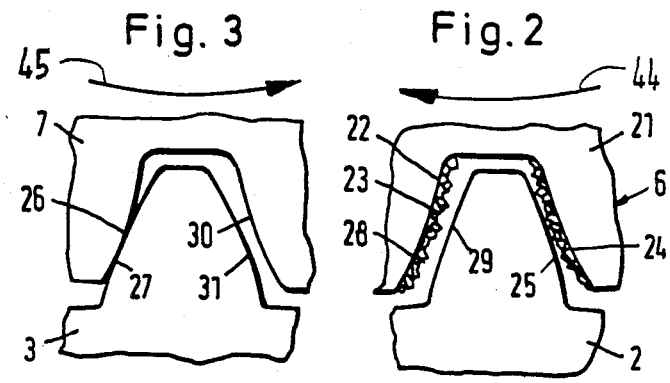
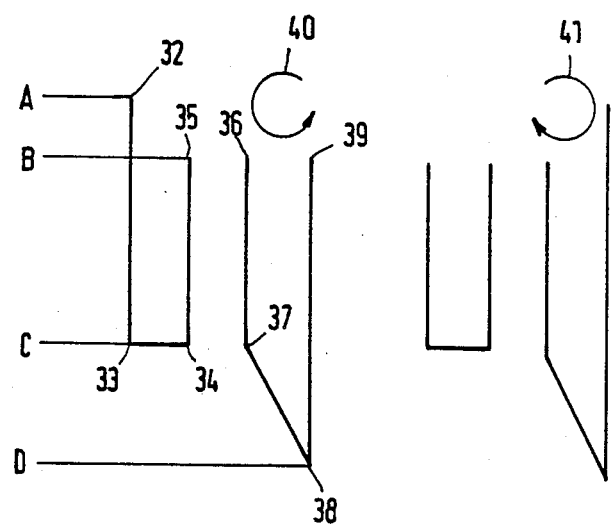
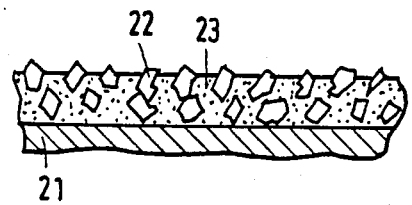

METHOD FOR THE PRECISION WORKING OF THE FLANKS OF GEARS WITH A GEAR-SHAPED TOOL COATED WITH HARD-MATERIAL GRANULES AND A METHOD FOR DRESSING SUCH A TOOL

CROSS REFERENCE TO RELATED APPLICATIONS

This application is related to the following copending applications:
1. Ser. No. 816,946, filed Jan. 6, 1986, which is a continuation of Ser. No. 576,672, filed Feb. 3, 1984, now abandoned.
2. Ser. No. 684,535, filed Dec. 29, 1984, now U.S. Pat. No. 4,602,458, issued July 29, 1986.
3. Ser. No. 692,269, filed Jan. 17, 1985.
4. Ser. No. 692,437, filed Jan. 17, 1985.

FIELD OF THE INVENTION

The invention relates to a method for the precision working of the flanks of toothed workpieces and a method for dressing the tool used therefor.

BACKGROUND OF THE INVENTION

A representative state of the art is known from German OS No. 33 04 98 (which corresponds to U.S. application Ser. No. 816,946, filed Jan. 6, 1986) which is not prepublished. Cubic boron nitride (CBN) is used for tools for the precision working of the flanks of gears, as they are described in this reference, just like in many other cases, and in which boron nitride is applied, for example galvanically, to the working surfaces, thus the tooth flanks, of a metallic base member. The machining operation results which are achieved with such tools are generally very satisfying. However, with respect to the edge life, these tools do not always meet the expectations of the user, since often a premature breaking out and a strong wear of the CBN-granules is noticed. The reason for this was first unknown, until it was discovered that the CBN requires a specific minimum cutting speed in order to bring about satisfactory work results over long periods of time. Thus, it is not possible to speed up the tool to the necessary cutting speed while it is already in engagement, because it has then already started machining at a cutting speed which is too low and the CBN-coating is thereby destroyed. This is valid both for the active, that is chip-removing use of the tool, and also the passive use, that is during a dressing of the tool.

Therefore, the basic purpose of the invention is to further develop the abovementioned method in such a manner that the mentioned difficulties no longer occur. The method is also to be usable for a dressing of the tools.

With respect to the precision working of toothed workpieces, the purpose is attained by:
(a) moving the tool into the tooth system of the workpiece; or vice versa;up and until a center distance corresponding with the start of the machining operation is attained;
(b) rotating the tooth system of one of the two parts of the workpiece-tool pair relative to the tooth system of the guide-gear pair until the machining tool flank on the one side engages the workpiece flank which is to be machined and on the other side engages the corresponding mating flank of the guide-gear pair;
(c) moving the tool with its guide-gear on the one side and the workpiece with its guide-gear on the other side away from one another while maintaining the flank contact in the guidegear pair up and until a condition whereat backlash exists on both sides of the tool tooth;
(d) activating the rotary movement and accelerating to the working speed;
(e) vertical feeding the tool relative to the workpiece (reducing the center distance) at a simultaneous chip removal, whereby the tool is guided by the guide-gear pair so that only one flank of the tool teeth engages the workpiece teeth;
(f) moving the tool and the workpiece apart, while the guiding is maintained by the guide-gear pair, and then deactivating the rotary movement;
(g) repeating the operation for the other tooth side of the workpiece and the tool.

It is possible with a method which is developed in this manner to bring the tool which is coated with CBN first to the necessary cutting speed before the machining operation starts. For reasons of economy, the tool should be dressed in the same machine in which it is being used. The tool which is coated with CBN must then be dressed with a dressing gear which is coated with diamonds. Thus far, the additional problem was created that the granules of the tool and the dressing gear claw into one another so that the granules are torn out. If, however, the method according to the invention is carried out utilizing granules on the dressing wheel that are harder than the CBN-coating, then the CBN-coating is substantially protected.

The dressing of the tool can occur in a very advantageous manner by:
(a) moving the tool which is to be dressed into the tooth system of the dressing wheel or vice versa;
(b) reducing the center distance to the smallest center distance of tool and dressing wheel;
(c) rotating the tooth system of one of the two parts of the tool-dressing-wheel pair relative to the tooth system of the guide-gear pair until the machining dressing-wheel flank engages the tool flank to be dressed on the one side and the corresponding mating flank of the guide-gear pair engage on the other side and backlash exists on the respective other flanks;
(d) moving the tool with its guide-gear on the one side and the dressing wheel with its guide-gear on the other side apart while maintaining flank contact in the guide-gear pair up and until a condition whereat backlash exists on both sides of the tool tooth;
(e) activating the rotary movement and accelerating to the working speed;
(f) vertically feeding the tool relative to the dressing wheel (reducing the center distance) with a simultaneous dressing of the tool flanks whereby the tool is guided by the guide-gear pair in such a manner that only one flank of the tool teeth engages the dressing-wheel teeth;
(g) moving the tool and the dressing wheel apart while guiding is maintained by the guide-gear pair and then deactivating the rotary movement;
(h) repeating the operation for the other tooth side of the tool and the dressing wheel.

BRIEF DESCRIPTION OF THE DRAWINGS

The invention will be discussed hereinbelow with reference to the exemplary embodiments which are illustrated in FIGS. 1 to 10. More specifically:

FIG. 2 schematically illustrates a portion of the tooth system of a workpiece-tool pair in an enlarged scale;

FIG. 3 schematically illustrates a portion of the tooth system of a guide-gear pair in a position which corresponds to FIG. 2;

FIG. 4 illustrates the diagram of a sequence of operation of the method according to the invention and for the precision working of tooth systems;

FIG. 5 illustrates in an enlarged scale a partial cross section of the flank of a tool or dressing wheel covered with several layers of granules;

DETAILED DESCRIPTION

Figure 1:
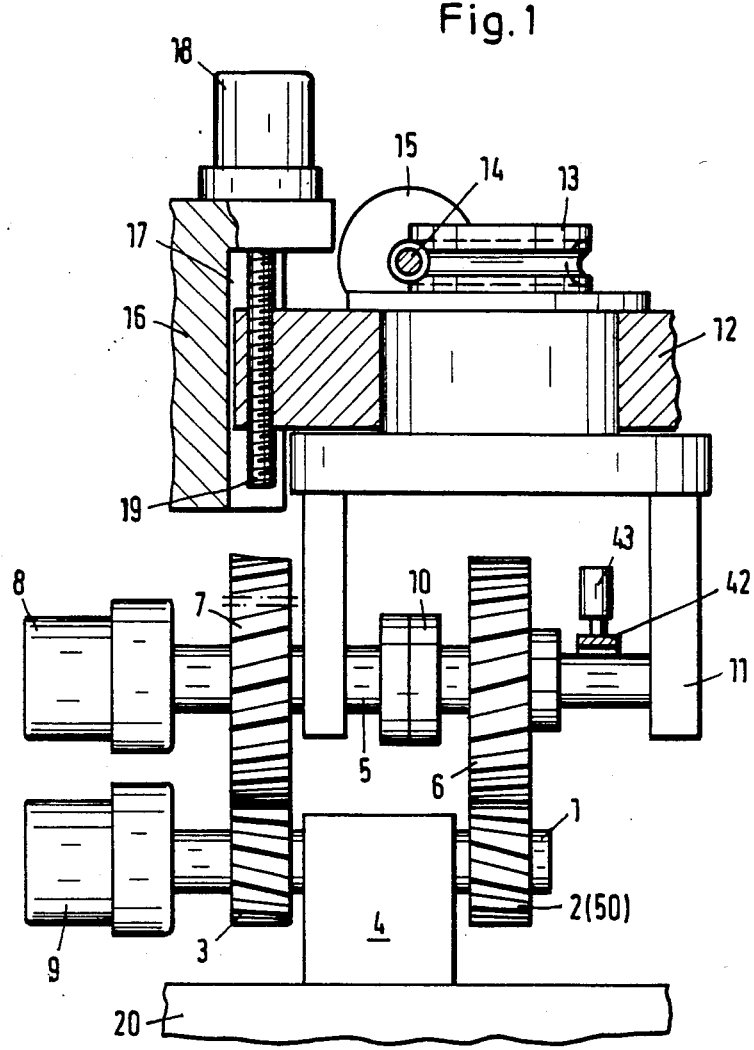
FIG. 1 schematically illustrates an apparatus on which the inventive method can be performed.

A workpiece 2 and next to it a first guide-gear 3 are exchangeably mounted on a workpiece spindle 1. A tool 6 and next to it a second guide-gear 7 are exchangeably mounted on a tool spindle 5. During a machining operation, the tool 6 mates with the workpiece 2 and the first guide-gear mates with the second guide-gear. The guide-gear pair 3,7 has the same speed ratio as the workpiece-tool pair 2,6. The entire gearing can run with spaced parallel axes or with axes which are skewed or crossed. If work is done with skewed or crossed axes and in the so-called plunge method, thus exclusively with a vertical feed, the tool 6 and the guide-gears 3,7 must be designed depending on the position of the crossed-axes point (common normal). If the crossed-axes point lies, for example, within the tooth system of the workpiece-tool pair, then the tool gripping around the workpiece must be formed hyperboloidally or globoidally or similarly. The guide-gears must also be designed accordingly, namely, because the crossed-axes point lies outside of the tooth system—and in addition conically. This is indicated in FIG. 1 on top on the guide-gear 7, even though the entire gearing is shown with parallel axes which, however, is only to be viewed as a schematic diagram. One of the two spindles, for example, the tool spindle 5, is coupled with a motor 8. The other spindle, for example the working spindle 1, is provided with a brake 9. Both can also be braking motors. A clutch 10 is furthermore provided on the tool spindle so that the tool 6 can be disconnected from the remaining gearing. Thus it is possible with this clutch either to separate the spindle 5 between the gears 7,6 in which case the tool spindle consists of two parts, or the spindle is continuous, in which case the tool 6 is separate from the spindle 5. A blocking brake 42 is in addition provided on the part of the tool spindle which can be separated from the drive motor 8, which blocking brake 42 can be operated by a hydraulic, pneumatic or electric operating member, for example an electromagnet 43.

The tool spindle 5 is rotatably supported on a tool head 11. The tool head 11 is rotatably supported on a tool carriage 12 that is not longitudinally movable. A worm gear 13 and a worm 14 are provided for rotating the tool head 11 relative to the tool carriage 12. The worm 14 can be driven by a crank mechanism or by a motor 15. With this structure a crossed-axes angle can be adjusted. In addition, structure for clamping the tool head in place is advantageous, which structure—since known—is not illustrated. The tool carriage 12 is movably supported in a guide 17 in a machine frame 16 and can be driven for movement by a motor 18 and connected feed spindle 19. The guide 17 of which in addition a second one (not illustrated) is provided, is aligned such that the distance between centers of the spindles 1 and 5 can be changed by an appropriate movement of the tool carriage. Clamping structure for locking the tool carriage in place is not illustrated since it is known.

The motors 15 and 18 for the tool head and the tool carriage, respectively, can be connected electrically or hydraulically with one another so that with a change of the distance between centers of the spindles, the tool head 11 rotates corresponding to the pitch angle, which depends on the center distance, in the pitch circle of the tooth system.

So far the machine has been described as a machine for working in the plunge method, that is for working only with a vertical feed (changing of the center distance of workpiece and tool). However, the invention can also be used for working with a longitudinal feed. In this case, the bearing block 4 is not supported on the machine frame, but on a carriage 20, which can be drivenly moved in selectable directions, as this is known, for example, from gear-shaving machines.

FIG. 1 is only a schematic illustration. The two gear pairs are preferably arranged closer together on the two spindles. Only the elements which are necessary for understanding the invention are illustrated and described. Machine frame, bearings, etc. are not illustrated, since they are known in principle.

FIG. 2 schematically and in an enlarged scale illustrates a portion of the tooth system of the workpiece 2 and the tool 6 in engagement during a machining operation. The tool consists of a metallic toothed base member 21, on the working surfaces, thus usually the tooth flanks, of which is applied a coating of boron nitride granules 22 and a binding agent 23, for example a synthetic resin, bronze or the like. The coating can have a layer of granules as it is illustrated in FIG. 2 or several layers of granules can be applied one above the other (FIG. 5). During the machining operation, the tool rolls along the workpiece 2 in a manner such that only one tooth flank 24 of the tool engages the corresponding tooth flank 25 of the workpiece 2. In the case of the guide-gear pair, only one tooth flank 26 engages the corresponding tooth flank 27 of the mating gear. The trailing flanks 28, 29, 30, 31 do not contact one another. During rolling along of the workpiece-tool pair, only the flanks 24 and 25 of one tooth side engage one another, while in the guide-gear pair the mating flanks 26 and 27 engage one another. Thus each gear pair runs with backlash, however, the entire gearing which consists of the elements 2,6,3,7, runs without backlash during the machining operation.

FIG. 4 schematically illustrates a sequence of operations according to the method of the invention. The letters A, B, C and D identify the position of the workpiece spindle 1 at four marked distances between centers of the two spindles 1 and 5. The thick full lines identify schematically the path of the tool relative to the workpiece. The circular arrows 40, 41 identify the direction of rotation of the rolling motion. At the center distance A, the workpiece is clamped to or otherwise mounted on the workpiece spindle, corresponding to the point 32. Then feeding occurs to a depth (center distance C) (corresponding to point 33), which corresponds to the start of the machining operation. The next steps are the opening or disengaging of the clutch 10, the activation of the brake 9 and the blocking brake 42 and the activation of the motor 8 at a creep speed in the direction of rotation 40. The tooth system of the guide-gear 7 and of the tool 6 rotates relative to one another, as is indicated schematically in FIGS. 2 and 3 by the arrows 44 and 45 (corresponding to point 34). As soon as the tooth flanks come into contact with one another, the motor 8 is deactivated, since it works with only a small performance in the creep feed made and cannot overcome the holding force of the blocking brake 42. (The brake 9 had already been opened again earlier when the guide-gears 3 and 7 had come into flank contact.) The motor 8 is turned off, the clutch 10 is closed or engaged, and the blocking brake 42 is opened. A driving apart of the spindles to a center distance B (corresponding to point 35) occurs. The flanks 26 and 27 of the guide-gears engage one another in this position (FIG. 3). The teeth of the workoiece and the tool have, however, differing from FIG. 2, backlash on both sides. The motor 8 is now activated in direction of rotation 40 at a speed which corresponds to the cutting speed (corresponding to point 36) and then an infeed first to a center distance C occurs whereat the tool flanks contact the workpiece flanks (corresponding to point 37) and continuation of the infeed occurs to the smallest center distance D (corresponding to point 38). The workpiece tooth flanks are machined during this time, namely, in two coordinates, one time due to the center distance change and the other time due to the change of the pressure angle of the tooth system of the guide-gears. This component which is directed perpendicularly with respect to the tooth flank is naturally very small. The last steps performed include the movement back to the center distance B and a deactivation of the motor 8 (corresponding to point 39). The operation is then repeated for the other tooth sides while rotating in the other direction of rotation 41. FIG. 4 illustrates the lines between the points 34, 35 and 36, 37 side by side for the purpose of clarity. In reality, however, the corresponding movements take place in the same planes, so that the lines would be congruent.

Instead of a motor 8 and a brake 9, it would also be possible to use two braking motors 8, 9. It would then be possible to carry out the tooth-flank change without a change in the direction of rotation by alternately switching the one motor to drive and the other motor to brake. Machining time can be saved by utilizing this arrangement.

Figure 10:
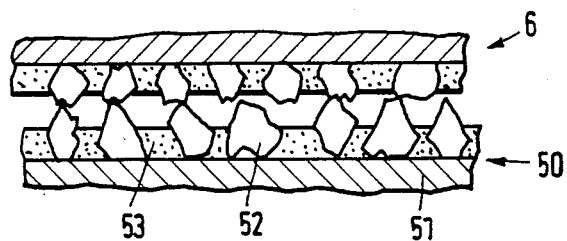
FIG. 10 illustrates the same portion as shown in FIG. 9 but in a condition after dressing has been completed.

The tool 6 can be dressed in the same apparatus as shown in FIG. 1. The workpiece 2 is for this purpose exchanged for a dressing wheel 50, which in practice can be done by a loading mechanism. The reference numeral of the dressing wheel was placed in FIG. 1 in parentheses next to the reference numeral 2 for the workpiece. The dressing wheel 50 has usually substantially the shape of the workpiece 2. The dressing wheel 50 consists of a base member 51 (FIG. 6), on the working surfaces, usually the tooth flanks, of which are applied diamond granules 52 or the like and held thereon by a binding agent 53 (see also FIG. 10). The coating can also be multi-layered, compare FIG. 5.

Figure 9:
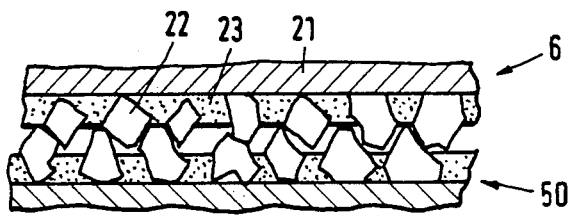
FIG. 9 schematically illustrates a portion of the working surfaces (tooth flanks) of the tool and the dressing wheel at the smallest distance between centers.

The method for dressing of the tool 6 differs only very little from the above-described method for the machining of a workpiece 2 with the tool 6. An important difference consists, however, in the center distance C for the relative rotation of the tooth systems (FIGS. 6,7) being able to be smaller than the center distance at the end of the dressing operation. As is shown in FIG. 9, the CBN-granules 22 of the tool 6 can project into the gaps between the diamond granules 52, so that a greater relative rotation of the tooth systems is possible than if the CBN-granules would come to rest on the envelope surface of the diamond granules.

Figures 6, 7:
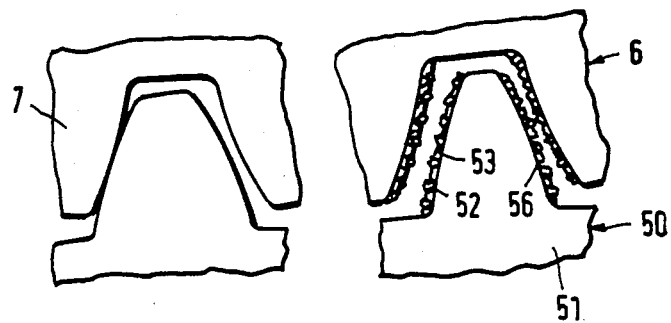
FIG. 6 schematically illustrates a portion of the tooth system of a tool-dressing-wheel pair in an enlarged scale.
FIG. 7 schematically illustrates a portion of the tooth system of the guide-gear pair in the position which corresponds to FIG. 6.
Figure 8:
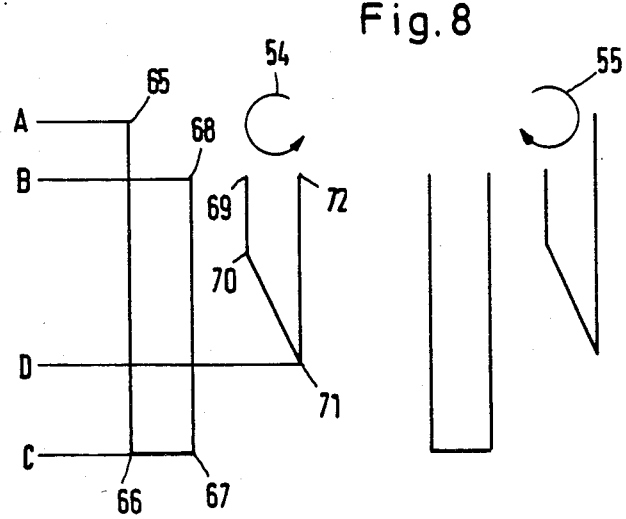
FIG. 8 schematically illustrates the sequence of operation of the method according to the invention and for dressing a tool.

One example for the sequence of operation during dressing is illustrated in FIG. 8. The circular arrows 54 and 55 identify the direction of rotation of the rolling motion. The work starts with the clamping or otherwise mounting of the dressing wheel 50—if dressing takes place in the machine tool—or with the clamping or otherwise mounting of the tool 6—if dressing takes place in a special apparatus—namely, at a center distance A (corresponding to point 65). The center distance of the spindles is reduced (corresponding to point 66) and the tooth systems of the tool 6 and the guide-gear 7 are rotated relatively to one another until the tooth flanks of the tool 6 and the dressing wheel 50 rest on one another and the tool and dressing wheel are supported on the tooth flanks of the guide-gears 3,7 (FIGS. 6,7). The manner of rotating is done as it was described in connection with FIG. 4 (corresponding to point 67). Since the motor 8 operates only with a small performance in creep feed, it stops as soon as the tooth flanks rest on one another. The center distance between the tool 6 and the dressing wheel 50 is now enlarged up and until backlash exists on both sides of the tool teeth and of the dressing wheel teeth (center distance B, (corresponding to point 68). After the motor 8 was turned on and has reached the speed which corresponds with the cutting speed (corresponding to point 69), the center distance is reduced until the flanks of dressing wheel 50 and the tool 6 come into contact (corresponding to point 70). The feed motion of the tool 6 relative to the dressing wheel 50 extends perpendicularly with respect to their axes and is then further continued for dressing, whereby through the pressure angle change of the guide-gears the feed motion is superposed by a further, however, small movement, which is directed perpendicularly with respect to the tooth flanks. Point 71 is reached at the end of the dressing operation, at which point the tool 6 and the dressing tool 50 have the position with respect to one another illustrated in FIGS. 6 and 10. The thereby attained center distance D is greater than the center distance C, in which the relative rotation of tool 6 and dressing wheel 50 occurred, because the CBN-granules 22 were not completely removed and the diamond granules 52 no longer project into the gaps between the CBN-granules. A driving back to the center distance B occurs thereafter (corresponding to point 72) and the operation is then repeated for the other tooth sides but with an opposite direction of rotation 55.

Although particular preferred embodiments of the invention have been disclosed in detail for illustrative purposes, it will be recognized that variations or modifications of the disclosed apparatus, including the rearrangement of parts, lie within the scope of the present invention.

the embodiments of the invention in which an exclusive property or privilege is claimed are defined as follows:

1. A method for the precision working of straight or helically toothed, externally or internally toothed, non-hardened or hardened workpieces with a gear-shaped tool, the tooth flanks of which are provided with a coating of cubic boron nitride (CBN) granules on an apparatus wherein the tool and the workpiece are each connected to a pair of mating guide-gears having the same speed ratio as the tool-workpiece pair, and in which the tool with the workpiece roll along on another in such a manner that during a machining operation in each case only the right or the left flank of the tool teeth engage the workpiece teeth and a means is provided for setting or adjusting the reciprocal angular position of the guide-gear and the tool for the purpose of effecting a change of the flank contact, comprising the following method steps:
   (a) moving the tool into the tooth system of the workpiece or vice versa up and until a center 20 distance corresponding with the start of the machining operation is attained;
   (b) rotating the tooth system of one of the two parts of the workpiece-tool pair relative to the tooth system of the guide-gear pair until the machining tool flank engage the workpiece flank which is to be machined and the corresponding mating counter-flanks of the guide-gear pair engage;
   (c) moving the tool with its guide-gear and the workpiece with its guide-gear away from one another while maintaining the counter-flank contact in the guide-gear pair up and until a condition whereat backlash exists on both sides of the tool tooth;
   (d) activating the rotary movement and accelerating to the working speed;
   (e) vertically feeding the tool relative to the workpiece (reducing the center distance) with a simultaneous chip removal, whereby the tool is guided by the guide-gear pair so that only one flank of the tool teeth engages the workpiece teeth;
   (f) moving the tool and the workpiece apart, while the guiding is maintained by the guide-gear pair, and then deactivating the rotary movement;
   (g) repeating the operation for the other tooth side of the workpiece and the tool.

2. A method according to claim 1, wherein the workpiece is exchanged with a gear-shaped dressing wheel, the tooth flanks of which are provided with a coating of hard-material granules which are harder than the CBN-coating on the tool.

3. A method for dressing of a straight or helically toothed, externally or internally toothed tool, which is used for the precision working of toothed workpieces and the tooth flanks of which are provided with a coating of cubic boron nitride (CBN) granules, with a gear-shaped dressing wheel, the tooth flanks of which are provided with a coating a hard-material granules of a greater hardness than those of the tool on an apparatus wherein the tool and the dressing wheel are each connected to a pair of mating guide-gears having the same speed ratio as the tool dressing-wheel pair, and in which the tool with the dressing wheel roll along on one another so that during a dressing operation in each case only the right or the left flank of the tool teeth engages the dressing-wheel teeth and a means is provided for setting or adjusting the reciprocal angular position of the guide-gear and the tool for the purpose of changing the flank contact, comprising the following method steps:
   (a) moving the tool which is to be dressed into the tooth system of the dressing wheel or vice versa;
   (b) reducing the center distance to the smallest center distance of the tool and dressing wheel;
   (c) rotating the tooth system of one of the two parts of the tool-dressing-wheel pair relative to the tooth system of the guide-gear pair until the machining dressing-wheel flanks engage the tool flank to be dressed and the corresponding mating counter flank of the guide-gear pair engage and backlash exists on the respective other flanks of the guide-gear pair and the tool-dressing wheel pair;
   (d) moving the tool with its guide-gear and the dressing wheel with its guide-gear apart while maintaining counter-flank contact in the guide-gear pair up and until a condition whereat backlash exists on both sides of the tool tooth;
   (e) activating the rotary movement and accelerating to the working speed;
   (f) vertically feeding the tool relative to the dressing wheel (reducing the center distance) with a simultaneous dressing of the tool flanks whereby the tool is guided by the guide-gear pair in such a manner that only one flank of each tool tooth engages the dressing-wheel teeth;
   (g) moving the tool and the dressing wheel apart while guiding is maintained by the guide-gear pair, and then deactivating the rotary movement;
   (h) repeating the operation for the counter-flanks of the tool and the dressing wheel.

* * * * *